US008581897B2

(12) United States Patent
Park

(10) Patent No.: US 8,581,897 B2
(45) Date of Patent: Nov. 12, 2013

(54) DC-DC CONVERTER AND ORGANIC LIGHT EMITTING DISPLAY USING THE SAME

(75) Inventor: Sung-Cheon Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 277 days.

(21) Appl. No.: 12/858,392

(22) Filed: Aug. 17, 2010

(65) Prior Publication Data

US 2011/0205204 A1    Aug. 25, 2011

(30) Foreign Application Priority Data

Feb. 19, 2010    (KR) .................. 10-2010-0015141

(51) Int. Cl.
*G09G 3/18* (2006.01)
(52) U.S. Cl.
USPC ............................................. 345/211; 345/52
(58) Field of Classification Search
USPC ........... 345/44, 45, 76, 77, 82, 207, 209, 211, 345/212, 213, 214, 215, 690, 52
See application file for complete search history.

(56) References Cited

U.S. PATENT DOCUMENTS

| 6,271,813 | B1 * | 8/2001 | Palalau ........................... 345/77 |
| 7,279,874 | B2 * | 10/2007 | Masuda ......................... 323/282 |
| 7,453,298 | B1 * | 11/2008 | Mlcousek et al. ............. 327/172 |
| 2004/0196676 | A1 * | 10/2004 | Ishii et al. ........................ 363/65 |
| 2005/0219188 | A1 * | 10/2005 | Kawabe et al. ................. 345/94 |
| 2008/0218503 | A1 * | 9/2008 | Lee ................................. 345/211 |
| 2008/0246702 | A1 * | 10/2008 | Lee et al. ......................... 345/77 |
| 2011/0084992 | A1 * | 4/2011 | Ishizuka ........................ 345/690 |

FOREIGN PATENT DOCUMENTS

| JP | 2006-343531 | 12/2006 |
| KR | 10-0662981 B1 | 12/2006 |
| KR | 10-2007-0034970 | 4/2007 |
| KR | 10-0889690 B1 | 3/2009 |
| KR | 10-2010-0018254 | 2/2010 |

OTHER PUBLICATIONS

KIPO Office action dated Mar. 2, 2012, for Korean priority Patent application 10-2010-0015141, (1 page).
Korean Patent Abstracts for Korean Publication 1020060039987, dated May 10, 2006, corresponding to Korean Patent 10-0662981 listed above.
Korean Patent Abstracts for Korean Patent 10-0859655 B1, dated Sep. 16, 2008, corresponding to Korean Patent application 10-2007-0034970 listed above.
Korean Patent Abstracts for Korean Publication 1020090021742, dated Mar. 4, 2009, corresponding to Korean Patent 10-0889690 listed above.

* cited by examiner

*Primary Examiner* — Joe H Cheng
*Assistant Examiner* — Nelson Rosario
(74) *Attorney, Agent, or Firm* — Christie, Parker & Hales, LLP

(57) ABSTRACT

A DC-DC converter and an organic light emitting display using the DC-DC converter are provided. The DC-DC converter can generate a first voltage and a second voltage lower than the first voltage, where the DC-DC converter includes a first voltage generator for generating the first voltage by switching an input voltage and accumulating energy in a first coil, a second voltage generator for generating the second voltage by switching an input voltage and accumulating energy in a second coil, a pulse width modulation (PWM) controller for controlling switching times of the first and second voltage generators in accordance with a control signal, and a voltage adjuster for generating the control signal to vary a voltage level of the second voltage and control a time of change of the second voltage.

10 Claims, 4 Drawing Sheets

DC-DC CONVERTER AND ORGANIC LIGHT EMITTING DISPLAY USING THE SAME

CROSS-REFERENCE TO RELATED APPLICATIONS

This application claims priority to and the benefit of Korean Patent Application No. 10-2010-0015141, filed on Feb. 19, 2010, in the Korean Intellectual Property Office, the entire content of which is incorporated herein by reference.

BACKGROUND

1. Field

An aspect of embodiments of the present invention relates to a DC-DC converter and an organic light emitting display using the same.

2. Description of the Related Art

Recently, various types of flat panel display devices have been developed that have reduced the weight and volume compared to cathode ray tube display devices. The flat panel display devices include a liquid crystal display, a field emission display, a plasma display panel, an organic light emitting display, and the like. Among these flat panel display devices, the organic light emitting display device displays images using organic light emitting diodes (OLEDs).

An organic light emitting diode includes an anode electrode, a cathode electrode and a light emitting layer positioned between the anode and cathode electrodes. When current flows in the direction from the anode electrode to the cathode electrode, the OLED emits light, so that a color can be expressed.

By employing organic light emitting diodes that are self-luminescent elements, the organic light emitting display device has several beneficial characteristics, including excellent color reproduction, thin thickness, and the like. Accordingly, the application fields for such devices have been widely extended to markets of mobile phones, PDAs, MP3 players and the like.

FIG. 1 is a graph showing changes in saturation point based on changes in the amount of current in an organic light emitting diode. The horizontal axis of the graph denotes the voltage of a ground power source, and the vertical axis of the graph denotes the amount of current that flows in the direction from an anode electrode to a cathode electrode of the organic light emitting diode.

Referring to FIG. 1, when saturation current is 150 mA, the voltage of the cathode electrode at a point where the OLED reaches a saturation point is 0 to −1 V. When the saturation current is 200 mA, the voltage of the cathode electrode at the point where the OLED reaches the saturation point is −1 to −2 V. When the saturation current is 250 mA, the voltage of the cathode electrode at the point where the OLED reaches the saturation point is below −2 V.

That is, the voltage of the cathode electrode is varied depending on the amount of saturation current. However, in an organic light emitting display, the voltage of the cathode electrode is generally fixed to a voltage corresponding to when the saturation current is greatest. That is, although it is less likely that images displayed in the organic light emitting display are all represented with the maximum gray level, the voltage of the cathode electrode is fixed to the voltage corresponding to when the saturation current is greatest. Therefore, waste of driving voltage, i.e., power consumption, is increased.

If the driving voltage is rapidly changed, noise is generated based on the change in driving voltage.

SUMMARY

In one embodiment, there are provided a DC-DC converter for preventing the voltage of a driver power source from being rapidly changed by adjusting the voltage of the driver power source and an organic light emitting display using the DC-DC converter.

According to an aspect of embodiments according to the present invention, there is provided a DC-DC converter for generating a first voltage and a second voltage lower than the first voltage, the DC-DC converter including a first voltage generator for generating the first voltage by switching an input voltage and accumulating energy in a first coil, a second voltage generator for generating the second voltage by switching an input voltage and accumulating energy in a second coil, a pulse width modulation (PWM) controller for controlling switching times of the first and second voltage generators in accordance with a control signal, and a voltage adjuster for generating the control signal to vary a voltage level of the second voltage and control a time of change of the second voltage.

According to another aspect of embodiments according to the present invention, there is provided an organic light emitting display including a display unit for displaying an image corresponding to a data signal, a scan signal, a first voltage and a second voltage, a data driver for generating the data signal and transferring the generated data signal the display unit, a scan driver for generating the scan signal and transferring the generated scan signal to the display unit, a DC-DC converter for generating the first and second voltages and transferring the generated first and second voltages to the display unit, and a controller for controlling the DC-DC converter, wherein the DC-DC converter includes a first voltage generator for generating the first voltage by switching an input voltage and accumulating energy in a first coil, a second voltage generator for generating the second voltage by switching an input voltage and accumulating energy in a second coil, a pulse width modulation (PWM) controller for controlling switching times of the first and second voltage generators in accordance with a control signal, and a voltage adjuster for generating the control signal to vary a voltage level of the second voltage and control a time of change of the second voltage.

In a DC-DC converter and an organic light emitting display using the same according to one embodiment of the present invention, the voltage level of a second voltage is adjusted corresponding to an amplitude of driving current changed depending on the luminance or size of a display screen, thereby reducing power consumption. In such case, it is possible to prevent the voltage level of the second voltage from being rapidly changed during a process of varying the second voltage, thereby reducing noise.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
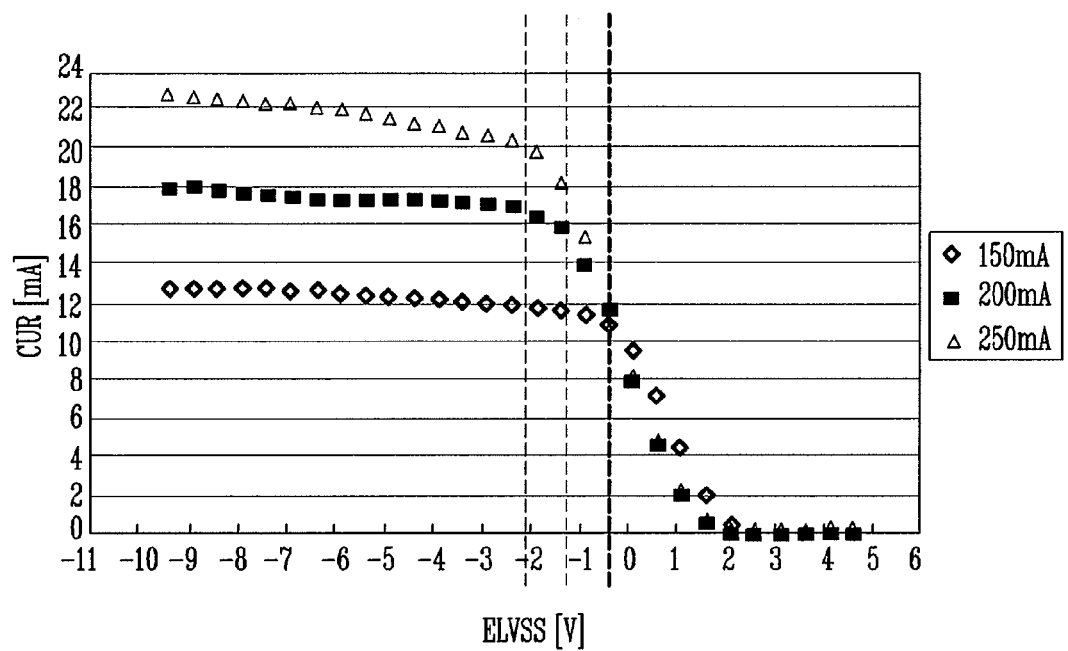
FIG. 1 is a graph showing changes in saturation points based on changes in the amount of current in an organic light emitting diode.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to the complete understanding of the invention are omitted for clarity. Also, like reference numerals refer to like elements throughout.

Figure 2:
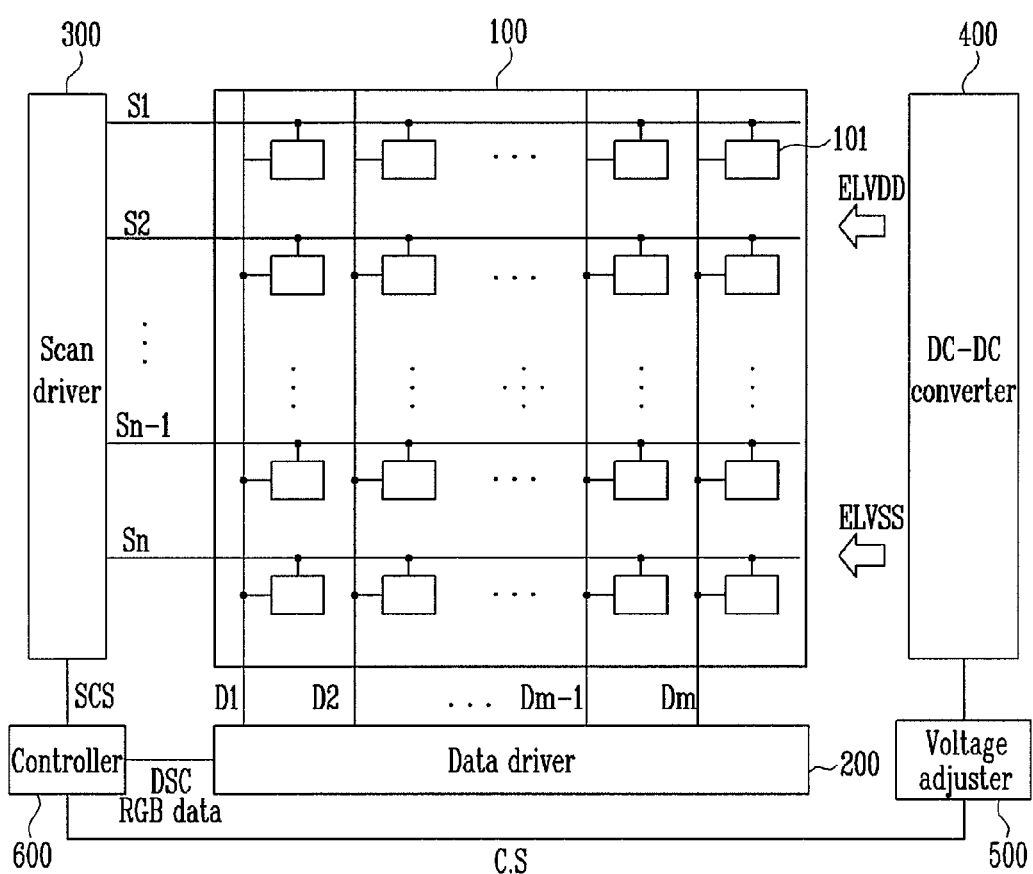
FIG. 2 is a schematic block diagram showing the structure of an organic light emitting display according to an embodiment of the present invention.

FIG. 2 is a schematic block diagram showing the structure of an organic light emitting display according to an embodiment of the present invention. Referring to FIG. 2, the organic light emitting display includes a display unit 100, a data driver 200, a scan driver 300, a DC-DC converter 400, a voltage adjuster 500 and a controller 600. A plurality of pixels 101 is arranged in the display unit 100, and each of the pixels 101 includes an organic light emitting diode that emits light corresponding to the flow of current provided thereto. The display unit 100 has n scan lines S1, S2, . . . , Sn–1 and Sn and m data lines D1, D2, . . . , Dm–1 and Dm, arranged therein. Here, the n scan lines are formed in (e.g., extend in) row directions to transfer scan signals, and the m data lines are formed in (e.g., extend in) column directions to transfer data signals.

The display unit 100 is driven using a first voltage ELVDD and a second voltage ELVSS transferred from the DC-DC converter 400. Thus, current is provided in organic light emitting diodes by the scan signals, the data signals, the first voltage ELVDD, the second voltage ELVSS and the like, so that the display unit 100 emits light to display images.

The data driver 200 generates data signals using image signals having red, green and blue components (R, G and B data). The data driver 200 generates and applies the generated data signals through the data lines to the display unit 100. The data driver 200 determines a data blanking period in which data signals are not transferred between one frame and the next frame, and a data display period in which data signals are transferred during one frame. In the period in which data signals are not transferred, images are displayed using previously transferred data.

The scan driver 300 generates scan signals and applies a scan signal to a specific row of the display unit 100 through each of the scan lines. A data signal generated from the data driver 200 is applied to a pixel 101 having the scan signal transferred thereto, so that a voltage corresponding to the data signal is transferred to the pixel 101.

The DC-DC converter 400 receives an input voltage applied thereto and generates the first voltage ELVDD and the second voltage ELVSS, which are driving voltages of the display unit 100. The DC-DC converter 400 receives a control signal C.S from the voltage adjuster 500 and adjusts the voltage level of the second voltage in accordance therewith. The voltage level of the second voltage may be changed in a blanking period. Thus, the change in the voltage level of the second voltage is adjusted, so that it is possible to prevent noise from being generated on the display screen based on the change in the voltage level of the second voltage. However, if the difference between first and second levels is large when the voltage level of the second voltage is changed from the first level to the second level, the voltage level of the second voltage is not changed from the first level to the second level in one blanking period but changed from the first level to the second level through a plurality of blanking periods. The rate at which a voltage is changed from the first level to the second level based on time is referred to as a slew rate. However, if the slew rate of the voltage level of the second voltage is adjusted so that the voltage level of the second voltage is rapidly changed, the voltage level of the second voltage can be changed from the first level to the second level in one blanking period. Thus, less noise is generated based on the change in the voltage level of the second voltage.

The voltage adjuster 500 controls the operation of the DC-DC converter 400 so that the amplitude of the driving voltage outputted from the DC-DC converter 400 can be adjusted based on the amplitude of driving current. At this time, the rise/fall time, i.e., the slew rate, is changed based on the size of a load corresponding to the light emitting area of the display unit 100, the luminance of the display unit 100, or the like. Here, the light emitting area of the display unit 100 is divided into a region at which images are displayed and a region at which images are not displayed based on the picture aspect ratio. The light emitting area of the display unit 100 refers to the area of the region at which images are displayed.

Thus, the period of time during which the voltage level of the second voltage changes from the first level to the second level or from the second level to the first level is changed based on the amplitude of the driving voltage outputted from the DC-DC converter 400. If the difference between the first and second levels is great and the slew rate is large, the voltage level of the second voltage is not sufficiently changed in the data blanking period. That is, the second voltage is changed in the data blanking period and the data display period. If the second voltage is also changed in the data display period, noise is generated. To solve such a problem, the voltage adjuster 500 adjusts the slew rate using a variable capacitor. That is, when the difference between the first and second levels is great, the time at which the voltage level of the second voltage increases from the first level to the second level is shortened by increasing the slew rate. When the difference between the first and second levels is small, the time at which the voltage level of the second voltage increases from the first level to the second level is lengthened by decreasing the slew rate.

The controller 600 detects the luminance and light emitting area of the display unit 100 and provides a control signal C.S to the voltage adjuster 500. The voltage adjuster 500 detects the change of a voltage and the level of the voltage to be changed through the control signal C.S.

Figure 3:
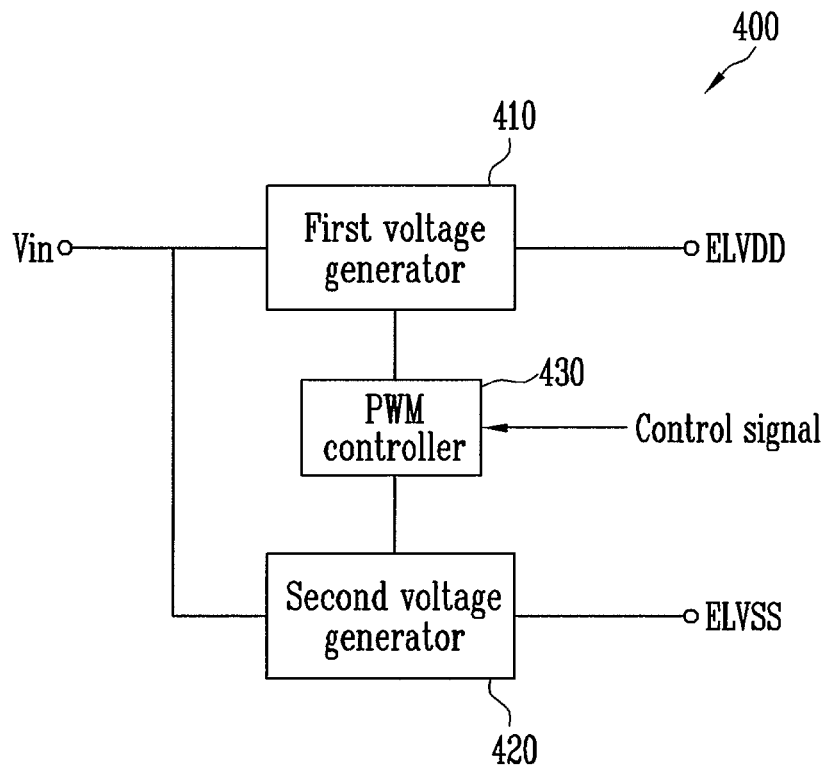
FIG. 3 is a schematic block diagram showing the structure of a DC-DC converter shown in FIG. 2.

FIG. 3 is a schematic block diagram showing the structure of the power supply unit shown in FIG. 2. Referring to FIG. 3, the DC-DC converter 400 includes a first voltage generator (or first generating unit) 410, a second voltage generator (or second generating unit) 420 and a pulse width modulation (PWM) controller (or PWM control unit) 430.

The first voltage generator 410 receives an input voltage Vin and generates the first voltage ELVDD. The first voltage generator 410 outputs the first voltage ELVDD by boosting the input voltage Vin. More specifically, the first generator 410 determines the voltage level of the second voltage by switching the input voltage Vin and accumulating an electromotive force (or energy) in a coil (not shown). The first voltage generator 410 in one embodiment uses a boost converter circuit.

The second voltage generator 420 receives the input voltage Vin and generates the second voltage ELVSS. The second voltage generator 420 outputs the second voltage ELVSS by inverting the input voltage Vin. More specifically, the second voltage generator 420 outputs the second voltage ELVSS by switching the input voltage Vin, accumulating an electromotive force (or energy) in a coil (not shown) and then inverting the input voltage Vin. The second voltage generator 420 in one embodiment uses a buck boost converter circuit.

The PWM controller 430 controls the switching operations of the first and second voltage generators 410 and 420. The switching operation of the PWM controller 430 is determined by a control signal inputted to the PWM controller 430. The time at which the input voltage is transferred to the first and second voltage generators 410 and 420 is controlled by the switching operation, so that an electromotive force is accumulated in the coil. Thus, the first voltage ELVDD is outputted from the first voltage generator 410, and the second voltage ELVSS is outputted from the second voltage generator 420.

Figure 4:
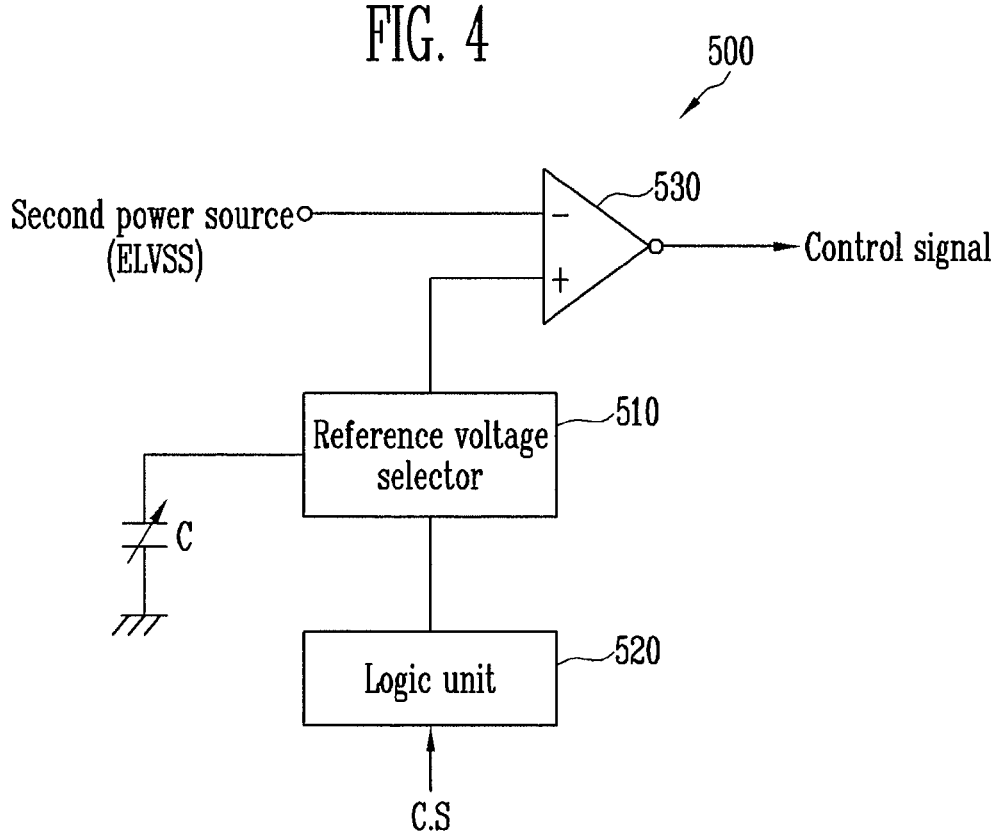
FIG. 4 is a schematic block diagram showing the structure of a voltage adjuster shown in FIG. 2.

FIG. 4 is a schematic block diagram showing the structure of the voltage adjuster shown in FIG. 2. Referring to FIG. 4, the voltage adjuster 500 includes a reference voltage selector 510, a logic unit 520, a comparator 530 and a capacitor C.

The reference voltage selector 510 selects one of a plurality of reference voltages so that the selected voltage can be outputted from the second voltage generator 420. The reference voltage selector 510 receives a selection signal from the logic unit 520. In the reference voltage selector 510, one of the plurality of reference voltages is selected by the selection signal, and the selected reference voltage is outputted to the comparator 530.

Figure 5A:
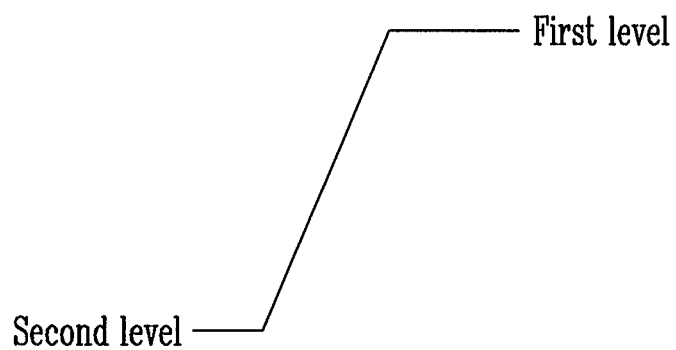
FIG. 5A is a graph showing a change in the voltage level of a second voltage according to an embodiment of the present invention.
Figure 5B:
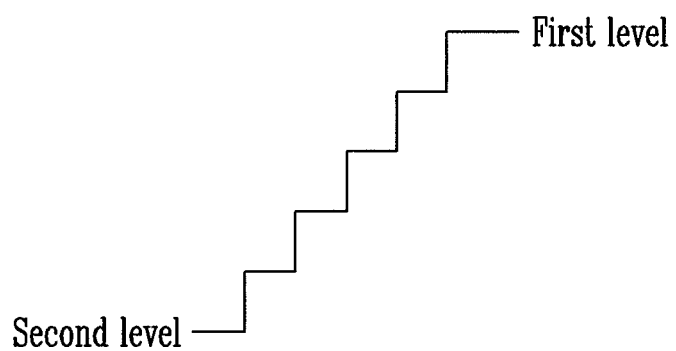
FIG. 5B is a graph showing a change in the voltage level of the second voltage according to another embodiment of the present invention.

If the control signal C.S is inputted to the logic unit 520 from the controller 600, the logic unit 520 detects the control signal C.S and generates the selection signal of the reference voltage selector 510. The selection signal contains information on the luminance of the display unit 100, the light emitting area of the display unit 100, and the like, which are transferred through the control signal C.S. The logic unit 520 outputs the selection signal corresponding to the information. The logic unit 520 may output the selection signal once or several times between one frame and the next frame. If the logic unit 520 outputs the selection signal once between one frame and the next frame, the voltage level of the second voltage is changed at a time from the first level to the second level as shown in FIG. 5A. If the logic unit 520 outputs the selection signal several times between one frame and the next frame, the voltage level of the second voltage is changed through several steps from the first level to the second level as shown in FIG. 5B.

By way of example, in one embodiment the first level in FIG. 5A may be −4.9 V and the second level in FIG. 5A may be −4.7 V, but the present invention is not limited thereto. Further, in one embodiment, the first level in FIG. 5B may be −4.9 V, the second level may be −4.4 V, and each step or adjustment may be 0.1 V, however, the present invention is not limited thereto.

The comparator 530 compares the reference voltage outputted from the reference voltage selector 510 with the voltage outputted from the second voltage generator 420 so that the error of the voltage level of the second voltage can be reduced. The signal outputted from the comparator 530 is transferred to the PWM controller 430. In the PWM controller 430, the pulse width of the output signal of the PWM controller 430 is adjusted using the output of the comparator 530.

The capacitor C allows the slew rate, at which the voltage level of the second voltage is changed from the first level to the second level, to be adjusted by varying its capacitance. The capacitance of the capacitor may be adjusted manually, for example, at the time of manufacturing. Referring back to FIG. 5A, in one embodiment, the slew rate may be about 20 microseconds, but the present invention is not limited thereto. Also, referring back to FIG. 5B, in one embodiment, the slew rate may be over 30 milliseconds (e.g., over multiple data blanking periods), but the present invention is not limited thereto.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A DC-DC converter for generating a first voltage and a second voltage lower than the first voltage, the DC-DC converter being coupled to a display unit and comprising:
   a first voltage generator for generating the first voltage by switching an input voltage and accumulating energy in a first coil;
   a second voltage generator for generating the second voltage by switching the input voltage and accumulating energy in a second coil;
   a pulse width modulation (PWM) controller for controlling switching times of the first and second voltage generators in accordance with a control signal; and
   a voltage adjuster for generating the control signal based on a luminance or an image display area of the display unit to vary a voltage level of the second voltage and control a time of change of the second voltage,
   wherein a time period for a data signal is divided into a data blanking period and a data display period, and
   wherein the voltage adjuster is configured to control the time of change of the second voltage by generating the control signal to vary the voltage level of the second voltage during the data blanking period.

2. The DC-DC converter according to claim 1, wherein the voltage adjuster comprises:
   a reference voltage selector for selecting one of a plurality of reference voltages corresponding to a selection signal and outputting the selected reference voltage;
   a logic unit for generating the selection signal;
   a comparator for receiving the selected reference voltage and the second voltage outputted from the second voltage generator to generate the control signal; and
   a capacitor for setting the time of change of the voltage levels between a previous reference voltage and the selected reference voltage.

3. The DC-DC converter according to claim 2, wherein the PWM controller is configured to control the switching times according to the control signal from the comparator.

4. The DC-DC converter according to claim 2, wherein the time is decreased when the capacitance is large, and the time is increased when the capacitance is small.

5. The DC-DC converter according to claim 1, wherein a number of operations, in which a voltage level of the second voltage is changed, is determined based on a number of selection signals generated between one frame and the next frame.

6. An organic light emitting display comprising:
a display unit for displaying an image corresponding to a data signal, a scan signal, a first voltage and a second voltage;
a data driver for generating the data signal and transferring the generated data signal to the display unit;
a scan driver for generating the scan signal and transferring the generated scan signal to the display unit;
a DC-DC converter for generating the first and second voltages and transferring the generated first and second voltages to the display unit; and
a controller for controlling the DC-DC converter,
wherein the DC-DC converter comprises:
    a first voltage generator for generating the first voltage by switching an input voltage and accumulating energy in a first coil;
    a second voltage generator for generating the second voltage by switching the input voltage and accumulating energy in a second coil;
    a pulse width modulation (PWM) controller for controlling switching times of the first and second voltage generators in accordance with a control signal; and
    a voltage adjuster for generating the control signal based on a luminance or an image display area of the display unit to vary a voltage level of the second voltage and control a time of change of the second voltage,
wherein a time period for a data signal is divided into a data blanking period and a data display period, and
wherein the voltage adjuster is configured to control the time of change of the second voltage by generating the control signal to vary the voltage level of the second voltage during the data blanking period.

7. The organic light emitting display according to claim 6, wherein the voltage adjuster comprises:
    a reference voltage selector for selecting one of a plurality of reference voltages corresponding to a selection signal and outputting the selected reference voltage;
    a logic unit for generating the selection signal;
    a comparator for receiving the selected reference voltage and the second voltage outputted from the second voltage generator to generate the control signal; and
    a capacitor for setting the time of change of the voltage levels between a previous reference voltage and the selected reference voltage.

8. The organic light emitting display according to claim 7, wherein the PWM controller is configured to control the switching times in accordance with the control signal from the comparator.

9. The organic light emitting display according to claim 7, wherein the time of change is decreased when the capacitance is large, and the time of change is increased when the capacitance is small.

10. The organic light emitting display according to claim 6, wherein a number of operations, in which a voltage level of the second voltage is changed, is determined based on a number of selection signals generated between one frame and the next frame.

* * * * *